March 20, 1951 W. M. SPRENG 2,545,829
DUSTER

Filed July 12, 1947 3 Sheets-Sheet 1

INVENTOR
WARREN M. SPRENG
BY
ATTORNEYS

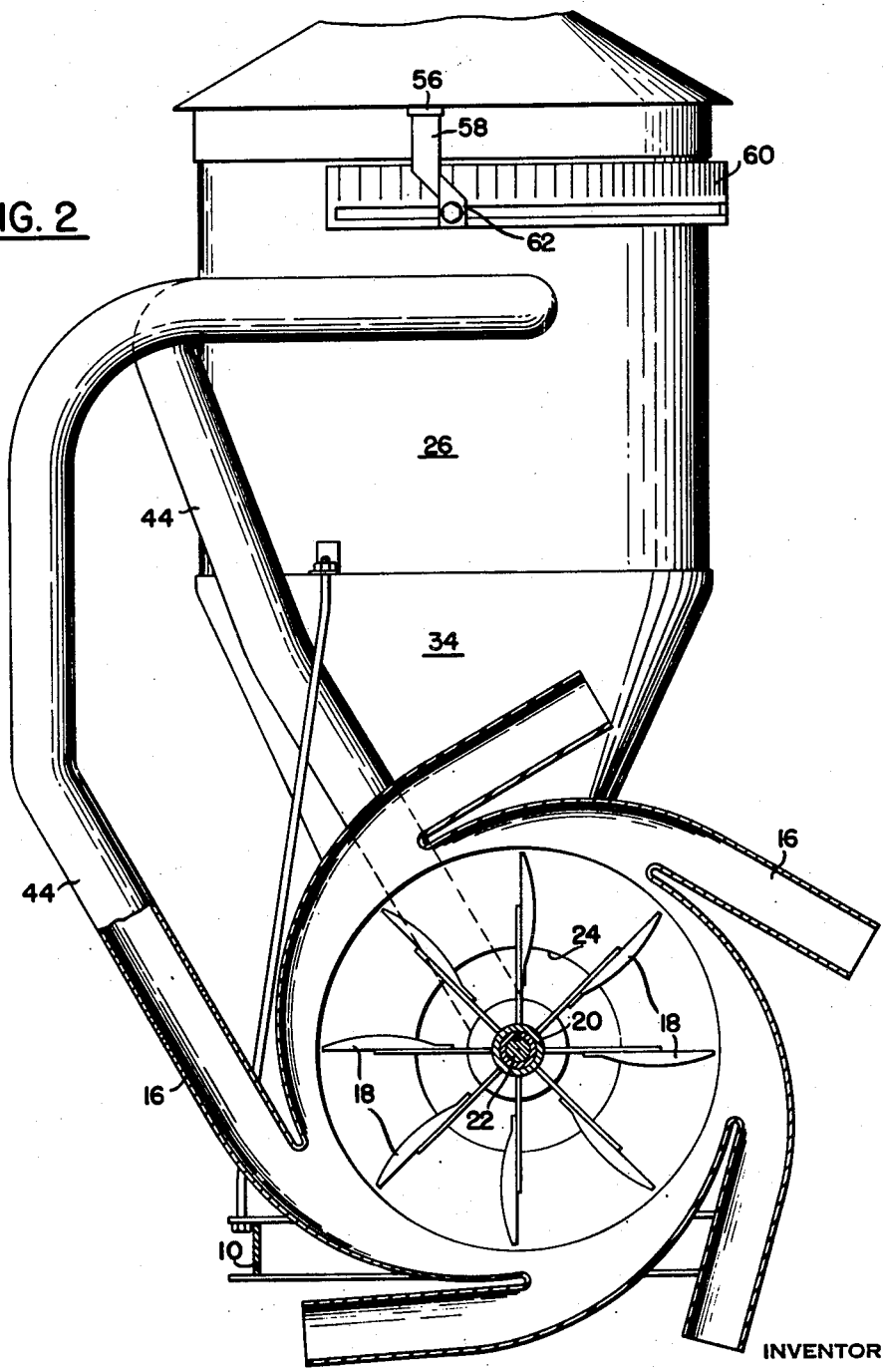

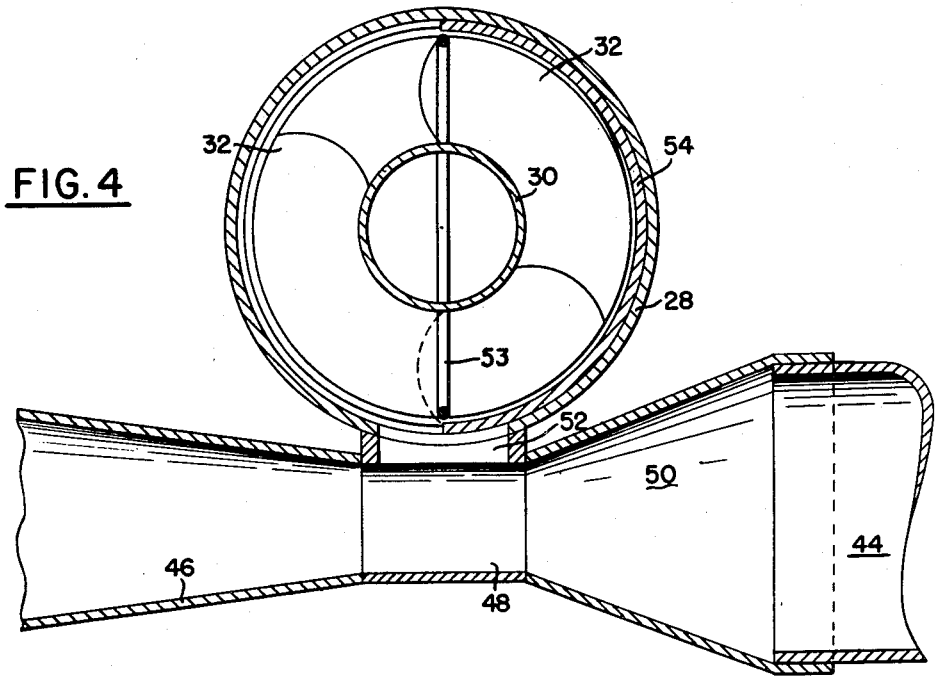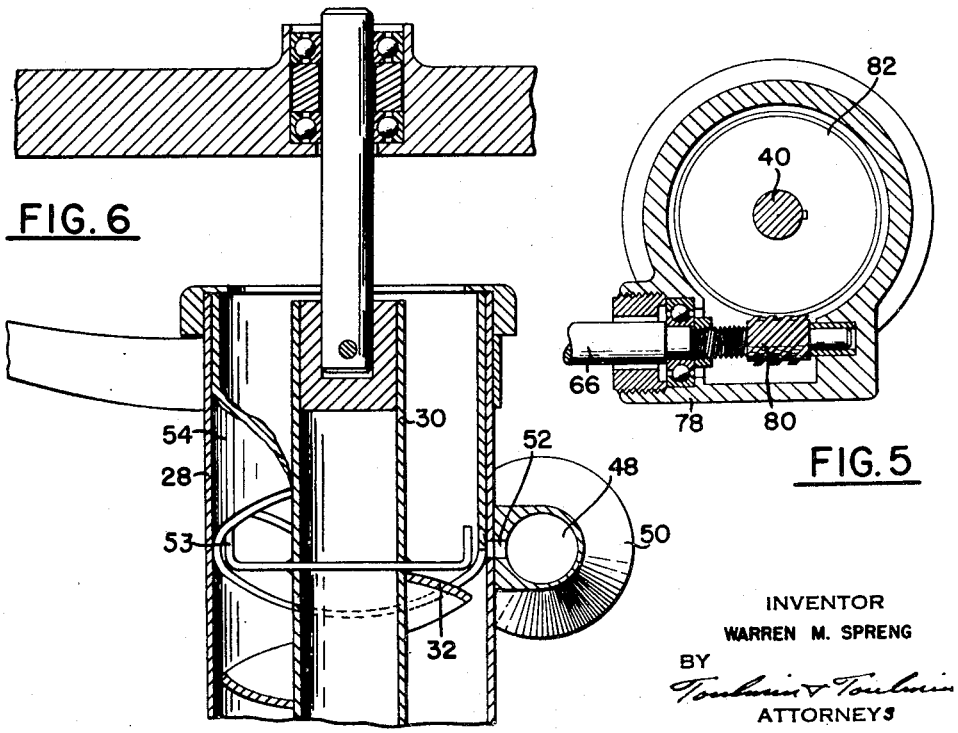

Patented Mar. 20, 1951

2,545,829

UNITED STATES PATENT OFFICE 2,545,829

DUSTER

Warren M. Spreng, Ashland, Ohio, assignor to
The F. E. Myers & Bro. Co., Ashland, Ohio, a
corporation of Ohio Application July 12, 1947, Serial No. 760,635

22 Claims. (Cl. 43—148)

This invention relates to dusting equipment for dispensing insecticides and the like in the form of a finely divided powder.

The object of this invention is to provide a duster which uniformly distributes the dust over a wide area.

Another object is to provide a duster for insecticides and the like which has a blower and which utilizes a portion of the discharge from the blower for supplying dust to the air stream.

Still another object is to provide a dusting device for insecticidal powders and the like wherein the dust is intimately mixed within the dispenser whereby a uniform product is discharged from the duster.

Another object is the provision of a duster for dispensing insecticidal powders and the like in which the amount of dust carried in the air can be closely regulated.

Still another object is the provision of a dusting mechanism according to any of the foregoing objects which is relatively inexpensive to manufacture and operate.

A still further object is the provision of an improved dusting device for insecticidal powders and the like which has a large capacity whereby it can be used to advantage in extensive field crop plantings, orchards and the like.

These and other objects and advantages will become more apparent upon reference to the following description taken in connection with the accompanying drawings in which:

Figure 2 is a side view thereof and is indicated substantially by the line 2—2 on Figure 1;

Figure 4 is a somewhat enlarged plan section indicated by the line 4—4 on Figure 1 and showing the means for introducing powder into the air stream of the device;

Figure 5 is a plan section taken on the line 5—5 of Figure 1 and showing a part of the drive into the mechanism; and Figure 6 is a vertical section indicated by the line 6—6 on Figure 1.

General arrangement

Figures 1, 3:
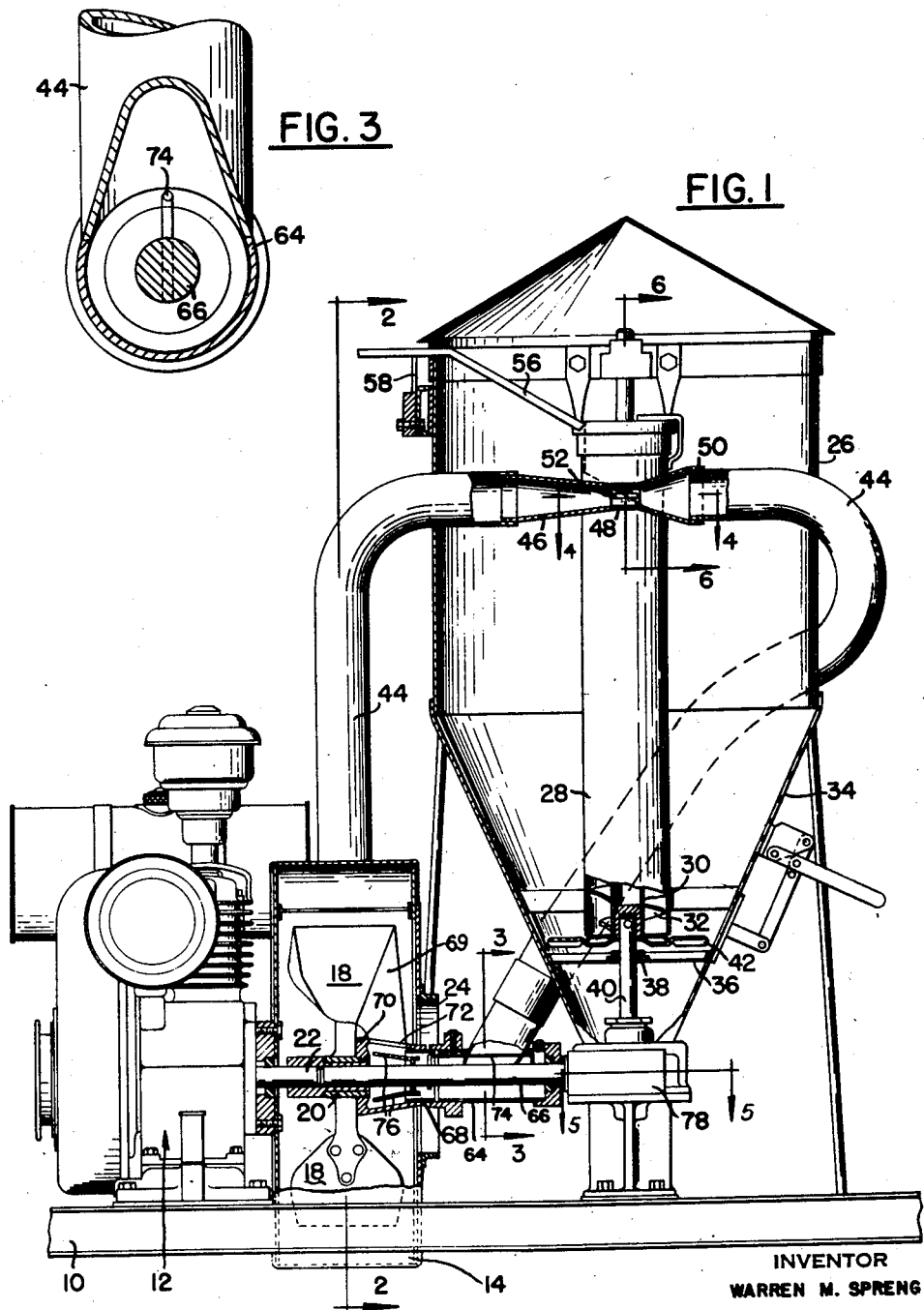
Figure 1 is a vertical section through a duster according to this invention.
Figure 3 is a vertical section indicated by the line 3—3 on Figure 1.

According to this invention there is provided a blower which preferably has a plurality of discharge nozzles. The plurality of discharge nozzles may be utilized to direct the discharge from the fan in a plurality of directions to obtain general coverage of a predetermined area or may, upon occasion, have conduits connected therewith for directing the fan discharge to a plurality of different locations.

The blower has an inlet through which the air blown thereby enters and there is an auxiliary air inlet to which air is supplied saturated with the powder it is desired to dispense by the blower.

The auxiliary inlet is connected to receive the discharge from one of the multiple outlets of the blower and is connected therewith by a channel which includes a venturi.

The aforementioned venturi has an inlet opening at its narrowest part which communicates with a dust supply hopper. By this means the suction at the narrowest part of the venturi is operable continuously to draw dust into the said conduit. This dust passes to the auxiliary inlet of the blower and is distributed uniformly thereby to the aforementioned several discharge openings.

Means are provided for varying the effective area of the opening through which the dust enters the Venturi throat and thereby the concentration of the dust-air mixture may be closely controlled.

Structural arrangement

Referring to the drawings, the device comprises a base or frame 10 which supports the several units of the device and which may itself be mobile or be mounted on a truck body or chassis.

Mounted on the frame 10 is a source of power 12 which is shown in the drawings as an internal combustion engine, and which, it will be understood, could consist of any suitable source of power for driving the blower and dust hopper screw.

Carried on the frame 10 adjacent the motor 12 is a blower having a housing or casing 14 from which extends a plurality of tangentially directed discharge openings or nozzles 16.

Rotatably mounted within the casing 14 is an impeller or fan wheel 18 which has its hub 20 rigidly connected with the output shaft 22 of the power unit 12. The impeller 18 is operable to draw air in through the inlet opening 24 and to discharge it under pressure through the nozzles 16.

Also mounted on the frame 10 and on the other side of the blower from the power unit 12 is a dust hopper 26. Centrally located within the dust hopper 26 is the vertical tube 28 within which is rotatable a shaft 30. The shaft 30 may be solid, or hollow as shown, and has mounted thereon a plurality of spaced fins or blades 32. By rotating the shaft 30 the fins 32 are operable to lift dust from the bottom of the tube upwardly whereupon the said dust will spill over the top of the tube and fall back into the main part of the hopper. This maintains the dust in a thoroughly admixed condition as well as preventing it from becoming packed down or lumping. Additionally the fins 32 give the dust an intermittent lifting motion so that it remains light and aerated throughout its travel through the tube 28. As will become apparent hereinafter this assists in the feeding of the dust to the blower.

The bottom of the hopper 26 is preferably conically shaped as at 34 and has a bottom at 36 just beneath the lower end of the tube 28. A sealing means at 38 surrounds the drive shaft 40 for the screw shaft 30 and prevents the dust from leaking from the bottom of the hopper.

There is preferably an impeller or finned member 42 carried on the bottom of the shaft 30 which continuously draws the dust in the hopper downwardly around its outer portion and, around its inner portion picks the dust up and moves it toward the lower end of the tube 28.

One of the discharge nozzles 16 is connected as at 44 in Figure 2 by a conduit which passes upwardly and transversely through the hopper 26. This is best seen in Figures 1 and 2 when it will be seen that the conduit 44 passes directly to the side of the tube 28 and then continues through the hopper and back toward the inlet opening of the blower.

The conduit 44, adjacent the tube 28, includes a venturi consisting of a tapered inlet 46, a throat 48 and a tapered discharge 50. According to well known physical laws, a passage of air through the venturi, when the said venturi is properly proportioned will create a sub-atmospheric pressure in the throat 48. This sub-atmospheric pressure is utilized for drawing dust from the tube 28 into the air stream passing through the conduit 44. This is accomplished by an opening 52 which communicates the throat 48 with the interior of the tube 28. The tube 28 in operation is normally filled with loose dust and thus there is a continuous supply of the said dust to the conduit 44.

For controlling the amount of dust supplied to the conduit 44, there is a sleeve 54 positioned within the upper end of the tube 28 and having its lower edge cut off at an angle. By rotating the sleeve 54 the effective area of the opening or port 52 can be varied and thereby the amount of dust passing into the conduit 44 varied. To assist in carrying the dust through the opening 52 there is a wiper 53 which has turned up end parts that pass closely by the port 52 as the shaft 30 rotates. These end parts of the wipers are inside the sleeve 54 but nevertheless act to thrust the dust laterally toward the port 52 where it is picked up by the vacuum in the Venturi throat.

The sleeve 54 is preferably connected with a lever 56 extending to the side of the hopper 26 and carrying a pointer 58. The lever 56 is suitably welded or brazed to the sleeve 54. The pointer 58 moves over a dial 60 and carried on the dial 60 is an adjustable stop member 62. When the lever 56 is positioned to bring the pointer 58 to the extreme left hand end of the dial 60, as viewed in Figure 2, the port 52 is completely closed. Any predetermined opening thereof may be had by thereafter moving the lever 56 to a predetermined position or to bring the pointer 58 thereof against the stop member 62.

The discharge end of the conduit 44 is connected to and opens into a sleeve 64 which surrounds a shaft 66. The sleeve 64 opens at its left end through a slip joint 68 into the interior of a hollow member 70 carried on the hub of the impeller 18. This hollow member forms an auxiliary inlet for the blower. A port 72 opens from the side of the hollow member 70 so that as the impeller 18 rotates the dust-air mixture being supplied to the member 70 will be distributed around the inside of the blower casing 14. For better distribution of the dust around the casing and to carry it to the outer circumference of the fan blade, a baffle 69 is carried by one of the blades of the fan which extends in and to the dust ejector 70 at the trailing side of the opening 72 thereof.

To prevent deposits of dust from accumulating within the sleeve 64 and the member 70 there is a wiper bar 74 carried by the shaft 66 which rotates within the sleeve 64 and the wiper members 76 which are carried on the end of the sleeve 64 and about which the member 70 rotates.

For driving the screw in the tube 28, the aforementioned shaft 66, which is connected at one end to the hub of the impeller 18, at its other end extends into a gear box 78. Within the gear box 78 the shaft 66 carries a worm 80 which runs on a worm wheel 82 keyed to the end of the shaft 40.

In operation, the power plant 12 is started thus to drive the impeller 18 and the screw shaft 30. This immediately sets up a passage of air through the blower and also a passage of air through the conduit 44 back to the auxiliary inlet of the blower defined by the hollow member 72. Rotation of the screw shaft 30 causes movement upwardly of powder in the tube 28 and this, together with the passage of air through the venturi in the conduit 44 brings about a supply of dust-laden air to the interior of the member 70.

The high speed rotation of the blower impeller and the air stream entering the blower inlet picks up the concentrated dust mixture from the opening 72 in the side of the member 70 and distributes it uniformly about the interior of the casing 14. The dust is thoroughly mixed with the air stream passing through the blower and emerges from the several discharge nozzles as a uniform dust-air mixture.

It will be apparent that this invention provides a means for supplying a thoroughly aerated and uniform dust to an air stream for distribution over field crop plants, trees and the like and due to the uniformity of the dust-air mixture and to the plurality of discharge openings in the blower, the coverage by the duster is very complete. This makes for an economical unit which utilizes as small an amount of dust as possible and distributes it uniformly over as large an area as possible. At the same time due to the general coverage obtained, the device is extremely rapid in operation.

It will be understood that this invention is susceptible to modification in order to adapt it to different usages and conditions and, accordingly, it is desired to comprehend such modifications within this invention as may fall within the scope of the appended claims.

I claim:

1. In a device for dispensing insecticidal dust and the like; a blower having an inlet and outlet opening; a dust hopper; means for presenting a portion of the dust at the bottom of the hopper to a position near the top thereof; a conduit extending from said dust hopper to the inlet of said blower to provide a closed dust conveying passage from said hopper to said inlet; and means, including a venturi positioned near the top of said hopper, for introducing dust from the top of said hopper into said conduit in response to the passage of air through said conduit, said air passing through said conduit conveying the dust introduced thereinto to said inlet and subsequently to the atmosphere.

2. A device for dispensing insecticidal powders and the like; a blower having a plurality of discharge openings and an inlet opening; a dust hopper; conduit means connecting one of said discharge openings with said inlet opening and forming a closed passage for conduction of air from the discharge opening to the inlet opening; and means including a dust-carrying device for supplying dust from the top of said hopper into said conduit for delivery thereby into said inlet opening whereby said blower discharges a dust-air mixture.

3. In a dispensing device for insecticidal powders and the like; a blower having an inlet opening and a plurality of discharge openings; a dust hopper; a conduit connecting one of said discharge openings with said inlet opening for diverting a portion of the blown air in a closed circuit to said inlet opening whereby said blower discharges a dust-air mixture; and means rendered active by the movement of said portion of air through said conduit and positioned at the top of said hopper for drawing an upper layer of dust from said hopper for delivery of said conduit to said inlet opening.

4. In a duster; a blower; a dust hopper; a vertical tube within said hopper; elevator means continuously conveying dust upwardly through said tube; a conduit extending past said tube and opening into the interior of said blower; a venturi in said conduit having a port in the throat thereof opening into said tube; said blower having means for blowing air through said conduit whereby dust is drawn from said tube through said port and admixes with the air stream passing through said venturi and distributed to the atmosphere; and means of varying the effective area of said port.

5. In a device for dispensing insecticidal dusts and the like; a blower having a plurality of discharge openings; a dust hopper; a vertical tube within said hopper; an elevating screw rotatable within said tube for lifting dust upwardly therein; a conduit extending through said hopper and opening into the interior of said blower; a venturi in said conduit; a pipe connecting the throat of said venturi with the interior of said tube; means to vary the effective area of said pipe; and means for positively distributing the dust supplied to said blower by said conduit circumferentially around the interior of the casing thereof and subsequently to the atmosphere.

6. In a dusting device for dispensing insecticidal dust and the like; a blower having a plurality of circumferentially spaced discharge nozzles; a centrally located inlet conduit for said blower; an auxiliary conduit having an inlet opening through said centrally located conduit; a hollow member mounted on the impeller of said blower for rotation therewith and connected with said auxiliary conduit; said member having a port opening laterally therefrom whereby dust supplied through said auxiliary conduit will be distributed circumferentially around the interior of the casing of said blower and subsequently to the atmosphere.

7. In a dust dispensing device; a blower having a casing and an impeller rotatably mounted therein; a plurality of circumferentially spaced and tangentially directed discharge nozzles; a conduit comprising a main inlet centrally located in said casing; an auxiliary conduit having an inlet extending into said main inlet; a hollow member carried by said impeller for rotation therewith and receiving the discharge from the said auxiliary conduit; said member having an opening extending laterally therefrom to receive the dust laden air from said auxiliary conduit.

8. In a duster; a dust hopper; a blower having a plurality of discharge nozzles and an opening at the center to constitute a main inlet; an auxiliary pipe for said blower substantially coaxial with said main inlet; a distributing member mounted for rotation with the impeller of said blower and positioned to receive the entire discharge from said auxiliary pipe; said member having a port in its side whereby rotation thereof distributes the discharge from said auxiliary pipe uniformly around the inside of said blower; and means of supplying dust laden air to said auxiliary pipe comprising a conduit connecting one of said discharge nozzles with said auxiliary pipe forming a closed air circuit therebetween and having therein a venturi with a throat connected with said dust hopper.

9. In a duster; a dust hopper; a tube extending vertically downward in said hopper; a screw in said tube for lifting dust therethrough continuously at a uniform rate; a conduit extending through said hopper and by the upper end of said tube and including a venturi, the throat of which is adjacent said tube; said tube having an opening which communicates with said venturi; means for passing air through said conduit to draw dust from said tube into said venturi continuously; and means for driving said feed screw to propel dust upwardly through said tube at a greater rate than it is drawn off by said venturi whereby to obtain a continuous and unbroken supply of dust at said port opening.

10. In a dust dispensing device; a hopper having a conical lower portion; a tube vertically disposed on the vertical axis of said hopper and having its lower end disposed within said conical portion; a feed screw in said tube rotatable for lifting powder therethrough and having spaced inclined lifting fins thereon for lifting the powder in a continuous flow; means of driving said screw for moving powder upwardly through said tube whereby said powder continuously spills over the top of said tube and is recirculated within said hopper; and means comprising a venturi having its throat in communication with said tube for drawing dust therefrom continuously.

11. In a dusting device; a blower having a plurality of discharge nozzles and a main inlet conduit; an auxiliary inlet conduit co-axial with said main inlet conduit; an impeller rotatably mounted in said blower; a hollow member secured to said impeller and positioned to receive the entire discharge from said auxiliary inlet conduit; said member having a lateral port communicating with said auxiliary conduit whereby the discharge from said auxiliary conduit is uniformly distributed about the interior of said blower by the rotation of said impeller; and an auxiliary blade on said impeller for carrying the dust from said auxiliary conduit toward the outer circumference of said impeller.

12. In a duster; a dust hopper; a tube extending vertically downward in said hopper; a screw in said tube for lifting dust therethrough; a conduit extending through said hopper and by the upper end of said tube and including a venturi, the throat of which is adjacent said tube; said tube having an opening communicating with said venturi; means for passing air through said conduit to draw dust from said tube into said venturi; means for driving said feed screw to propel dust upwardly through said tube at a greater rate than it is drawn off by said venturi; and a wiper means on said feed screw rotatable therewith in said tube and operable to urge dust in said tube toward said port.

13. In a device for dispensing insecticidal dust and the like; a dust hopper; a blower having a plurality of discharge openings and a main inlet opening; said blower having an auxiliary inlet opening adjacent said main inlet opening for conduction of auxiliary air into said blower with the conduction of air through said main inlet opening into said blower; conduit means connecting one of said discharge openings with said auxiliary inlet opening and including a venturi and forming a closed passage for conduction of air from the discharge opening to the inlet opening, said venturi being positioned near the top of said hopper, means for raising dust at a predetermined rate from the bottom of the hopper to the top thereof at the position of said venturi; channel means connecting the throat of said venturi with said dust hopper through which dust is supplied into said conduit for delivery thereby into said inlet opening; and means for varying the effective area of said channel means to regulate the quantity of dust delivered into said conduit.

14. In a duster; a dust hopper; a tube extending vertically downward in said hopper; a screw in said tube for lifting dust therethrough continuously at a uniform rate; a conduit extending through said hopper and by the upper end of said tube and including a venturi, the throat of which is adjacent said tube; said tube having a port opening into said venturi; means for passing air through said conduit to draw dust from said tube into said venturi continuously; means for driving said feed screw to propel dust upwardly through said tube at a greater rate than it is drawn off by said venturi whereby to obtain a continuous and unbroken supply of dust at said port opening; and a valve within said sleeve selectively adjustable for varying the size of said port opening.

15. The method of dispensing insecticidal dust and the like which includes, establishing a main air flow for distributing a dust over a selected distribution area, establishing a secondary circulation of dust to provide a relatively uniform movement of dust in an established circulating flow, diverting a portion of said main air flow for recirculation and return to the said main air flow, creating in the said diverted portion an area of low pressure which communicates directly with said secondary circulation of dust whereby to withdraw a uniform quantity of dust for admixture with said diverted portion of air, and thereafter delivering the so admixed dust and diverted air portion into the main air flow for distribution thereby.

16. The method of dispensing insecticidal dust and the like which includes, establishing a main air flow for distributing a dust over a selected distribution area, establishing a secondary circulation of dust to provide a relatively uniform movement of dust in an established circulating flow, establishing a closed air diverting circuit which in part includes the circuit for the main air flow for diverting a portion of the said main air flow for recirculation and return to the said main air flow, continuously withdrawing a uniform quantity of dust from said secondary circulation of dust by said diverted portion of said main air flow for admixture with said diverted portion, and thereafter delivering the so admixed dust and diverted air portion into the main air flow.

17. The method of dispensing insecticidal dust and the like which includes, establishing a main air flow for distributing a dust over a selected distribution area, establishing a secondary circulation of dust to provide a relatively uniform movement of dust in an established circulating flow, establishing a closed air diverting circuit which in part includes the circuit for the main air flow for diverting a portion of the said main air flow for recirculation and return to the said main air flow, creating in the said diverted portion an area of low pressure which communicates directly with said secondary circulation of dust whereby to withdraw a uniform quantity of dust from said secondary circulation of dust for admixture with said diverted portion of air, and thereafter delivering the so admixed dust and diverted air portion into the main air flow for distribution thereby.

18. In a dust dispensing apparatus, a hopper for containing a supply of dust, an open ended tube vertically disposed in said hopper, a feed screw in said tube rotatable for lifting dust therethrough and conducting the dust over the top of the said tube, an agitator adjacent the bottom end of said tube, said agitator having fins thereon for inducing a downward movement of dust around the outside of said tube and an upward movement of dust within said tube, means connected with said screw and agitator for rotating the same, and an air conduit having a venturi therein, the throat of said venturi including a passage communicating with the interior of said tube for drawing dust therefrom as continuously lifted through said tube by said screw.

19. In a dust dispensing apparatus, a hopper for receiving a supply of dust, an open ended tube vertically disposed in said hopper, agitator means at the bottom of said tube cooperating with feed means within said tube for causing a uniform flow of dust upwardly through said tube and continuous recirculation of the said dust at a uniform rate between said hopper and through said tube, a blower for distributing dust over a selected area of distribution and having an inlet opening and a discharge opening, conduit means forming a closed circuit from the discharge of said blower to the inlet thereof through which a portion of the discharge from said blower is continuously recirculated through said blower, means in said conduit for producing an area of low pressure therein, and means forming a passage connection between said area of low pressure in said conduit and the upper end of said tube whereby to draw dust from said tube into said conduit continuously at a uniform rate.

20. In a dust dispensing apparatus, a hopper for receiving a supply of dust, an open ended tube vertically disposed in said hopper, agitator means at the bottom of said tube cooperating with feed means within said tube for causing a uniform flow of dust upwardly through said tube and continuous recirculation of the said dust at a uniform rate between said hopper and through said tube, a blower for distributing dust over a selected area of distribution and having an inlet opening and a discharge opening, conduit means forming a closed circuit from the discharge of said blower to the inlet thereof through which a portion of the discharge from said blower is continuously recirculated through said blower, means in said conduit for producing an area of low pressure therein, means forming a passage connection between said area of low pressure in said conduit and the upper end of said tube whereby to draw dust from said tube into said conduit continuously at a uniform rate, and valve means cooperating with said passage connection for regulating the flow of dust through the said passage connection.

21. In a dust dispensing apparatus, a hopper for receiving a supply of dust, an open ended tube vertically disposed in said hopper, agitator means at the bottom of said tube cooperating with feed means within said tube for causing a uniform flow of dust upwardly through said tube and continuous recirculation of the said dust at a uniform rate between said hopper and through said tube, a blower for distributing dust over a selected area of distribution and having an inlet opening and a discharge opening, means forming an auxiliary inlet opening extending through the said inlet opening, means forming a chamber within said blower and rotatable with the impeller of said blower and communicating with said means forming said auxiliary inlet opening whereby to receive the flow from said auxiliary opening, conduit means forming a closed circuit from said discharge opening of said blower to said means forming said auxiliary inlet opening whereby to divert a part of the exhaust from said blower for continuous recirculation through the interior of said blower, means in said conduit forming an area of low pressure, and means forming a passage connection from said area of low pressure to the upper end of said tube whereby to continuously draw dust from the upper end of said tube into said conduit for delivery into said blower from said auxiliary inlet opening, said chamber having an opening in a side thereof through which said portion of diverted air and dust enters into said blower in substantially radial distribution throughout the interior of said blower during rotation of said chamber with said impeller.

22. In a dust dispensing apparatus, a hopper for receiving a supply of dust, an open ended tube vertically disposed in said hopper, agitator means at the bottom of said tube cooperating with feed means within said tube for causing a uniform flow of dust upwardly through said tube and continuous recirculation of the said dust at a uniform rate between said hopper and through said tube, a blower for distributing dust over a selected area of distribution and having an inlet opening and a discharge opening, means forming an auxiliary inlet opening extending through the said inlet opening, means forming a chamber within said blower and rotatable with the impeller of said blower and communicating with said means forming said auxiliary inlet opening whereby to receive the flow from said auxiliary opening, conduit means forming a closed circuit from said discharge opening of said blower to said means forming said auxiliary inlet opening whereby to divert a part of the exhaust from said blower for continuous recirculation through the interior of said blower, means in said conduit forming an area of low pressure, means forming a passage connection from said area of low pressure to the upper end of said tube whereby to continuously draw dust from the upper end of said tube into said conduit for delivery into said blower from said auxiliary inlet opening, said chamber having an opening in a side thereof through which said portion of diverted air and dust enters into said blower in substantially radial distribution throughout the interior of said blower during rotation of said chamber with said impeller, and wiper means rotatable within said means forming said auxiliary inlet opening and within said chamber to eliminate accumulation of dust therein.

WARREN M. SPRENG.

REFERENCES CITED

The following references are of record in the file of this patent:

UNITED STATES PATENTS

| Number | Name | Date |
| --- | --- | --- |
| 581,244 | Allen et al. | Apr. 20, 1887 |
| 1,182,118 | Tow et al. | May 9, 1916 |
| 1,394,686 | Redmon et al. | Oct. 25, 1921 |
| 1,476,994 | Meyer et al. | Dec. 11, 1923 |
| 1,624,321 | Dunnagan | Apr. 12, 1927 |
| 1,750,147 | Wright | Mar. 11, 1930 |
| 1,832,963 | Burger | Nov. 24, 1931 |
| 2,256,561 | Hoelscher | Sept. 23, 1941 |
| 2,282,828 | Root | May 12, 1942 |
| 2,310,620 | Dye | Feb. 9, 1943 |